United States Patent
Hu et al.

(10) Patent No.: US 10,781,136 B2
(45) Date of Patent: Sep. 22, 2020

(54) GLASS WITH SINGLE REINFORCED LAYER AND PREPARATION METHOD THEREOF

(71) Applicant: Chongqing Aureavia Hi-tech Glass Co., Ltd., Chongqing (CN)

(72) Inventors: Wei Hu, Guangdong (CN); Fanghua Chen, Guangdong (CN); Zhenyu Chen, Guangdong (CN)

(73) Assignee: Chongqing Aureavia Hi-tech Glass Co., Ltd., Chongqing (CN)

( * ) Notice: Subject to any disclaimer, the term of this patent is extended or adjusted under 35 U.S.C. 154(b) by 349 days.

(21) Appl. No.: 15/801,311

(22) Filed: Nov. 1, 2017

(65) Prior Publication Data

US 2018/0072618 A1 Mar. 15, 2018

Related U.S. Application Data

(63) Continuation of application No. PCT/CN2016/086517, filed on Jun. 21, 2016.

(30) Foreign Application Priority Data

Jun. 16, 2016 (CN) .......................... 2016 1 0428115

(51) Int. Cl.
| | |
|---|---|
| *C03C 21/00* | (2006.01) |
| *C03C 3/087* | (2006.01) |
| *C03C 3/085* | (2006.01) |
| *C03C 23/00* | (2006.01) |
| *G06F 1/16* | (2006.01) |
| *C03C 4/18* | (2006.01) |

(52) U.S. Cl.
CPC ............ *C03C 21/002* (2013.01); *C03C 3/085* (2013.01); *C03C 3/087* (2013.01); *C03C 23/007* (2013.01); *G06F 1/1613* (2013.01); *C03C 4/18* (2013.01); *C03C 2204/00* (2013.01)

(58) Field of Classification Search
None
See application file for complete search history.

(56) References Cited

U.S. PATENT DOCUMENTS

| 2013/0224492 A1* | 8/2013 | Bookbinder | .......... C03C 23/007 |
| | | | 428/410 |
| 2013/0236666 A1* | 9/2013 | Bookbinder | ............ C03C 3/083 |
| | | | 428/34.4 |
| 2015/0079398 A1* | 3/2015 | Amin | .................... C03C 17/225 |
| | | | 428/408 |

(Continued)

*Primary Examiner* — David Sample

(57) ABSTRACT

The present invention relates to glass with a single reinforced layer, comprising a glass body and the single reinforced layer formed in a surface of the glass body. The compressive stress of the single reinforced layer trends to decrease non-linearly from the surface of the glass body to the interior of the glass body. The compressive stress curve of the single reinforced layer has an inflection point. The gradient of a first curve section in front of the inflection point is greater than the gradient of a second curve section behind the inflection point. The overall refractive index of the single reinforced layer trends to decrease non-linearly from the surface of the glass body to the interior of the glass body. The refractive index curve of the single reinforced layer has at least two inflection points. Furthermore, a method for preparing the glass with a single reinforced layer is provided.

6 Claims, 3 Drawing Sheets

(56) References Cited

U.S. PATENT DOCUMENTS

| | | | |
|---|---|---|---|
| 2015/0239775 A1* | 8/2015 | Amin | C03C 3/085 428/220 |
| 2015/0274585 A1* | 10/2015 | Rogers | C03C 21/002 361/679.26 |
| 2015/0368148 A1* | 12/2015 | Duffy | C03C 21/002 428/220 |
| 2017/0158556 A1* | 6/2017 | Dejneka | C03C 21/002 |

* cited by examiner

GLASS WITH SINGLE REINFORCED LAYER AND PREPARATION METHOD THEREOF

CROSS-REFERENCE TO RELATED APPLICATIONS

This application is a continuation application of PCT Application No. PCT/CN2016/086517 filed on Jun. 21, 2016 which claims priority to Chinese Application No. 201610428115.X filed on Jun. 16, 2016, the entire contents of which are hereby incorporated by reference.

TECHNICAL FIELD

The present invention relates to the technical field of glass manufacturing, and particularly to glass with a single reinforced layer, and a preparation method thereof.

BACKGROUND

Chemically reinforced glass is currently widely used in mobile phones, media players and other terminals, due to its high transparency, high strength and abrasion resistance. The high strength of the chemically reinforced glass is achieved by ion exchange. The principle is that small ions in the glass can be replaced by the large ions in a molten salt bath at high temperatures, and the large ions are tightly piled up on the glass surface to create a strong compressive stress after replacement, whereby a high strength is exhibited.

However, during the ion exchange process, the large ions in the molten salt bath are diluted with increasing number of small ions exchanged out. If the same molten salt bath is still used, the compressive stress of the glass will be reduced. In order to solve such a technical problem, a solution is employed at present, in which the ion exchange is achieved with two different molten salt baths. The glass is initially subjected to ion exchange in a first molten salt bath, and then taken out, cooled and dried after the large ions in the first molten salt bath are diluted to some degree, preheated again, and then subjected to ion exchange in a second molten salt bath, where the concentration of the large ions in the second molten salt bath is greater than that of the large ions in the diluted first molten salt bath. The stress distribution in the compressive stress layer formed by treatment with such molten salt baths is that the compressive stress layer does not change much in the depth direction and the compressive stress layer has a continuous monolayer structure. The concentration of the large ions exchanged varies over the depth of the glass in such a pattern that the concentration of the large ions is high merely at a position close to the glass surface and declines sharply inside the glass. This will necessarily result in uneven strength distribution of the compressive stress layer of the reinforced glass finally formed.

In short, so far, the stress distribution or the concentration of the exchanged ions in the monolayer compressive stress layer formed in the glass surface through physical or chemical tempering or through one or more tempering processes decreases progressively along the direction from the glass surface to the interior of the glass, resulting in a compressive stress layer that does not change much in the depth direction. As a result, the overall strength of the glass is failed to be improved.

SUMMARY OF THE INVENTION

Accordingly, the present invention provides glass with a single reinforced layer and a preparation method thereof, so as to enhance the internal composite compressive stress of the glass, thereby achieving an increased overall strength of the glass.

Glass with a single reinforced layer comprises a glass body and the single reinforced layer formed in a surface of the glass body. The compressive stress of the single reinforced layer trends to decrease non-linearly from the surface of the glass body to the interior of the glass body. The compressive stress curve of the single reinforced layer has an inflection point, and the gradient of a first curve section in front of the inflection point is greater than the gradient of a second curve section behind the inflection point. The overall refractive index of the single reinforced layer trends to decrease non-linearly from the surface of the glass body to the interior of the glass body, and the refractive index curve of the single reinforced layer has at least two inflection points.

Preferably, the single reinforced layer contains metal ions exchanged into the single reinforced layer, and the molar concentration of the metal ions exchanged into the single reinforced layer trends to gradually decrease non-linearly in a direction running from the surface of the glass body to the interior of the glass body.

Preferably, a first inflection point on the refractive index curve of the single reinforced layer is located at a position between 5-30 um in the direction running from the surface of the glass body to the interior of the glass body, and located at a position reaching 4-50% of a total ion-exchange depth in the direction running from the surface of the glass body to the interior of the glass body. A second inflection point is located at a position between 10-50 um in the direction running from the surface of the glass body to the interior of the glass body, and located at a position reaching 8-85% of the total ion-exchange depth in the direction running from the surface of the glass body to the interior of the glass body. A maximum value of the refractive index presents at an outermost surface of the glass body, and the difference between the maximum value and the refractive index of the glass body is not higher than 0.1.

Preferably, the total ion-exchange depth is not less than 60 μm, and the compressive stress at the surface of the glass body is not less than 600 Mpa Preferably, the reinforced glass has a thickness of 0.1-10 mm.

A method for preparing a glass with a single reinforced layer comprises:

Step A: providing glass, preheating the glass in a temperature environment lower than that of a molten salt bath, and subjecting the preheated glass to a first ion exchange process for a time $T_1$ in the molten salt bath, to form a reinforced layer $L_1$ in a surface of the glass;

Step B: thermally processing the glass formed with the reinforced layer $L_1$ for a time $t_h$ that is from above 20 min to 30 min in an temperature environment of $T_h$ ranging from 390° C. to a temperature that is 10° C. below an annealing point of the glass, to allow the ingredient of the molten salt bath adhered to the glass surface to further undergo ion exchange with the glass, and allow the reinforced layer $L_1$ to expand toward the interior of the glass by at least 3 μm, wherein the distribution of the ions exchanged into the reinforced layer $L_1$ is diluted, and a reinforced layer $L_2$ is formed by integrating the ions newly exchanged in this step; and Step C: cooling the glass having the reinforced layer $L_2$ to the temperature of the molten salt bath, and subjecting the glass to a second ion exchange process in the same molten salt bath in Step A; or rinsing the glass, and then subjecting the glass to a second ion exchange process in a molten salt bath different from that in Step A, where the time for the second ion exchange process is $t_2$, the temperature for the second ion exchange process is $T_2$; and a reinforced layer $L_3$ is formed on the surface of the glass having the reinforced layer $L_2$ by ion exchange, the reinforced layer $L_2$ inside the glass undergoes ion exchange with the ions inside and peripheral to the glass and expands continuously toward the interior and periphery of the glass along a direction of the concentration difference, the reinforced layer $L_3$ expands at a rate higher than that of the reinforced layer $L_2$, and after full ion exchange reaction, the reinforced layer $L_3$ is overlapped with the reinforced layer $L_2$, to form a single reinforced layer, where the time and temperature for the second ion exchange process in Step C and the time and temperature for the thermal processing in Step B satisfy $T_2 \times t_2 < T_h \times (t_h/2)$.

Preferably, the glass having the reinforced layer $L_1$ obtained in Step A is taken out, cooled, and rinsed, to remove the ingredient of the molten salt bath adhered to the glass surface in Step A completely, and then the rinsed glass having the reinforced layer $L_1$ is used in the process of Step B.

Preferably, Steps B-C are repeated, until a satisfactory single reinforced layer is formed in the glass.

Preferably, the temperature of the molten salt bath is 350-550° C. during the first and second ion exchange process.

Preferably, the glass is alkaline silicate glass comprising 15-72 wt % of $SiO_2$; 10-43 wt % of $Al_2O_3$ or/and $P_2O_5$ in total; 8-33 wt % of alkaline metal oxides in total; and less than 15 wt % of other oxides.

Compared with the prior art, the present invention has the following advantages.

In the preparation method according to the present invention, a condition is established between the time and temperature for the thermal processing in Step B and the time and temperature for the second ion exchange process in Step C: $T_2 \times t_2 < T_h \times (t_h/2)$. Glass with a single reinforced layer having characteristics different from those of the reinforced glass in the prior art is obtained through the preparation process where the condition is satisfied. Firstly, the refractive index of the glass has unique features. That is, the refractive index of the single reinforced layer trends to decrease non-linearly, on the whole, from the surface of the glass body to the interior of the glass body, and the refractive index curve of the single reinforced layer has at least two inflection points. Secondly, the compressive stress distribution of the glass has its own features. That is, the compressive stress of the single reinforced layer trends to decrease non-linearly from the surface of the glass body to the interior of the glass body; and the compressive stress curve of the single reinforced layer has an inflection point, the gradient of a first curve section in front of the inflection point is greater than a second curve section behind the inflection point.

DETAILED DESCRIPTION

Figure 1:
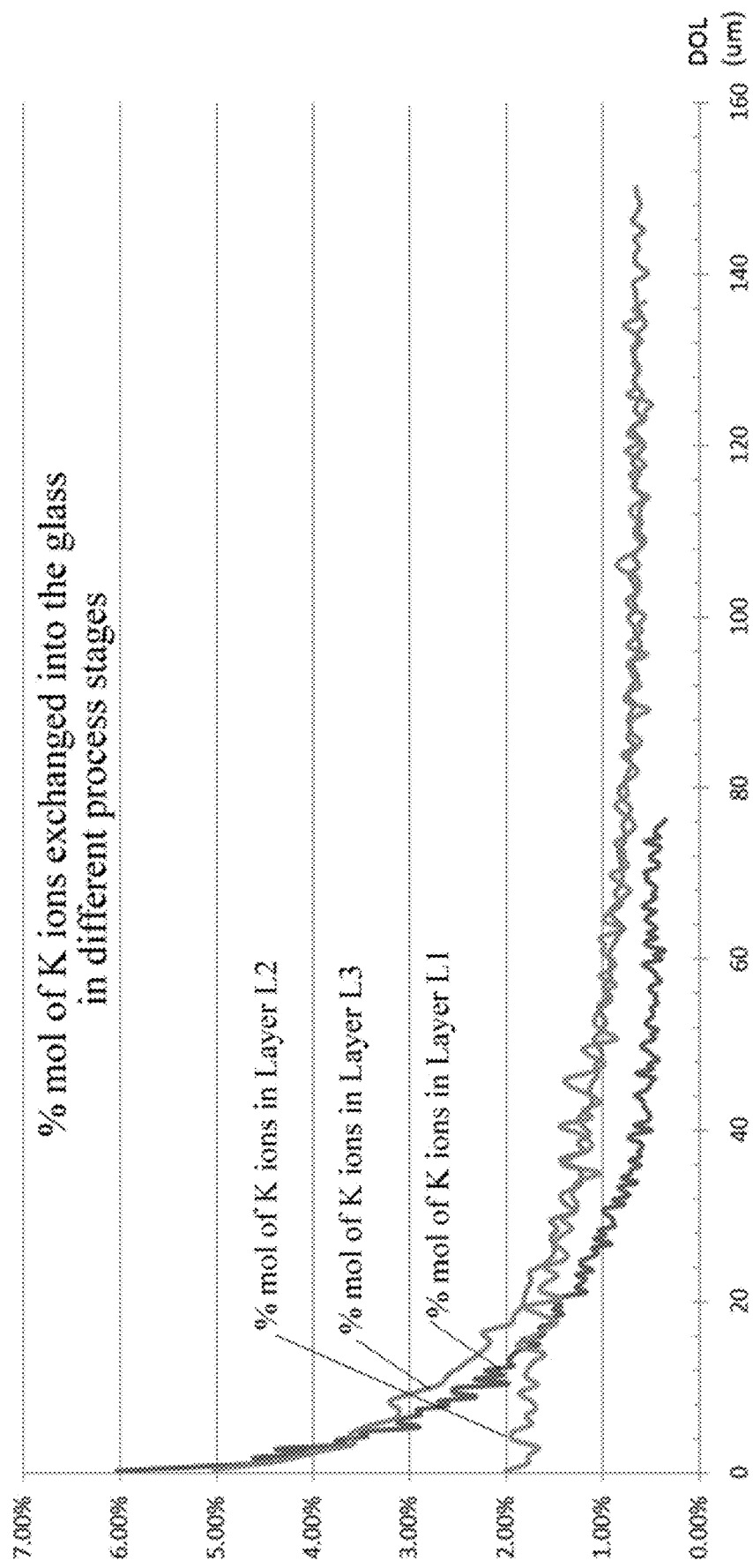
FIG. 1 shows distribution curves of K ions in molar percentage in reinforced layers obtained in different steps in an embodiment of the present invention.

To make the objects, technical solutions and advantages of the present invention clearer, the present invention will now be described in further detail by way of examples with reference to the accompanying drawings. It is to be understood that the specific embodiments described herein are merely illustrative of the present invention and are not intended to limit the present invention.

The present invention provides a method for preparing glass with a single reinforced layer, which comprises the following steps.

Step A: Glass is provided, preheated in a temperature environment lower than that of a molten salt bath, and subjected to a first ion exchange process for a time $T_1$ in the molten salt bath, to form a reinforced layer $L_1$ in a surface of the glass.

Step B: The glass formed with the reinforced layer $L_1$ is thermally processed for a time $t_h$ that is from above 20 min to 30 min in an temperature environment of $T_h$ ranging from 390° C. to a temperature that is 10° C. below an annealing point of the glass, to allow the ingredient of the molten salt bath adhered to the glass surface to further undergo ion exchange with the glass, and allow the reinforced layer $L_1$ to expand toward the interior of the glass by at least 3 μm, where the distribution of the ions exchanged into the reinforced layer $L_1$ is diluted, and a reinforced layer $L_2$ is formed by integrating the ions newly exchanged in this step.

Step C: The glass having the reinforced layer $L_2$ is cooled to the temperature of the molten salt bath, and the glass is subjected to a second ion exchange process in the same molten salt bath in Step A; or the glass is rinsed, and then subjected to a second ion exchange process in a molten salt bath different from that in Step A, where the time for the second ion exchange process is $t_2$, and the temperature for the second ion exchange process is $T_2$; and a reinforced layer $L_3$ is formed on the surface of the glass having the reinforced layer $L_2$ by ion exchange, the reinforced layer $L_2$ inside the glass undergoes ion exchange with the ions inside and peripheral to the glass and expands continuously toward the interior and periphery of the glass along a direction of the concentration difference, the reinforced layer $L_3$ expands at a rate higher than that of the reinforced layer $L_2$, and after full ion exchange reaction, the reinforced layer $L_3$ is overlapped with the reinforced layer $L_2$, to form a single reinforced layer; and the time and temperature for the second ion exchange process in Step C and the time and temperature for the thermal processing in Step B satisfy $T_2 \times t_2 < T_h \times (t_h/2)$.

Optionally, the glass having the reinforced layer $L_1$ obtained in Step A is taken out, cooled, and rinsed, to remove the ingredient of the molten salt bath adhered to the glass surface in Step A completely, and then the rinsed glass having the reinforced layer $L_1$ is used in the process of Step B. The rinsing process before Step B is provided for preventing the influence on the purity and the stress intensity of the final single reinforced layer by the ingredient of the molten salt bath that is reacted and attached to the glass surface during the thermal processing of Step B.

Optionally, Steps B-C are repeated, until a single reinforced layer meeting the compressive stress and depth requirements is formed on the glass.

During the preparation process, the temperature of the molten salt bath is 350-550° C.

By means of the preparation method, glass with a single reinforced layer is obtained, which comprises a glass body and a single reinforced layer formed in a surface of the glass body. The compressive stress of the single reinforced layer trends to decrease non-linearly from the surface of the glass body to the interior of the glass body. The compressive stress curve of the single reinforced layer has an inflection point, and the gradient of a first curve section in front of the inflection point is greater than the gradient of a second curve section behind the inflection point. The overall refractive index of the single reinforced layer trends to decrease non-linearly from the surface of the glass body to the interior of the glass body, and the refractive index curve of the single reinforced layer has at least two inflection points.

In the glass with a single reinforced layer, the single reinforced layer contains metal ions exchanged into the single reinforced layer, and the molar concentration of the metal ions exchanged into the single reinforced layer trends to gradually decrease non-linearly in a direction running from the surface of the glass body to the interior of the glass body.

In the glass with a single reinforced layer, a first inflection point on the refractive index curve of the single reinforced layer is located at a position between 5-30 um in the direction running from the surface of the glass body to the interior of the glass body, and located at a position reaching 4-50% of a total ion-exchange depth in the direction running from the surface of the glass body to the interior of the glass body. A second inflection point is located at a position between 10-50 um in the direction running from the surface of the glass body to the interior of the glass body, and located at a position reaching 8-85% of the total ion-exchange depth in the direction running from the surface of the glass body to the interior of the glass body. A maximum value of the refractive index presents at an outermost surface of the glass body, and the difference between the maximum value and the refractive index of the glass body is not higher than 0.1.

In the glass with a single reinforced layer, the total ion-exchange depth is not less than 60 μm, and the compressive stress at the surface of the glass body is not less than 600 Mpa.

The glass with a single reinforced layer has a thickness of 0.1-10 mm.

The glass for forming the single reinforced layer is alkaline silicate glass comprising 15-72 wt % of $SiO_2$; 10-43 wt% of $Al_2O_3$ or/and $P_2O_5$ in total; 8-33 wt % of alkaline metal oxides ($Li_2O$ or/and $Na_2O$ or/and $K_2O$) in total; and less than 15 wt % of other oxides.

EXAMPLE

Molten salt bath: 100% $KNO_3$;

The time period and temperature for the first ion exchange process and the time period and temperature for the second ion exchange process satisfy: $T_2 \times t_2 < T_h \times (t_h/2)$.

The temperature and time period for the first ion exchange process: 430° C., 3.5 h;

The time period and temperature for the thermal processing: 530° C., 2h;

The temperature and time period for the second ion exchange process: 430° C., 1 h;

Component of the glass to be reinforced:

| Component | Content (wt %) |
|---|---|
| $SiO_2$ | 61 |
| $Al_2O_3$ | 17.3 |

-continued

| Component | Content (wt %) |
|---|---|
| $Fe_2O_3$ | 0.5 |
| CaO | 0.2 |
| MgO | 3.2 |
| $K_2O$ | 1.8 |
| $Na_2O$ | 15.5 |
| $TiO_2$ | 0.5 |

As shown in FIG. 1, after Step A is performed, a reinforced layer $L_1$ is formed on the surface and inside the glass, and the distribution of the exchanged ions K in molar percentage is as shown by the curve of the reinforced layer $L_1$ in FIG. 1. After Step B is performed, the glass is placed in an environment where no source of ions for exchange is available, the K ions inside the reinforced layer $L_1$ can only be further exchanged with Na inside the glass, and the distribution of K expands toward the interior of the glass on one hand, and is diluted on the other hand, thus forming a reinforced layer $L_2$. FIG. 1 shows a distribution curve of the exchanged K ions in molar percentage in the reinforced layer $L_2$. After Step C is performed, the reinforced layer $L_2$ is redistributed again, and thus expands further toward the interior of the glass on one hand, and is further diluted on the other hand. As new K ions are exchanged into the glass from the molten salt bath containing the source of ions for exchange, the K ions newly entered the glass moves at a rate much faster than that of the existing reinforced layer $L_2$ in the glass, and is combined with the reinforced layer $L_2$, to form a reinforced layer $L_3$. FIG. 1 shows a distribution curve of the exchanged K ions in molar percentage in the reinforced layer $L_3$.

Moreover, if a rinsing process is additionally added before Step B, and the same conditions are maintained in the subsequent procedure steps, the resulting outcome can be slightly reflected in the curve of the reinforced layer $L_2$ and the curve of the reinforced layer $L_3$ obtained in Steps B and C respectively. The curve of the reinforced layer $L_2$ obtained in Step B becomes slightly flattened, and the gradient will be smaller. The curve of the reinforced layer $L_3$ obtained in Step C also has the same characteristics of change. The change in the curve of the reinforced layer $L_3$ is very small, because a large amount of K ions newly entered the glass from the molten salt bath in Step C, and the molar concentration of these K ions masks the changes that present in step B. Therefore, although a rinsing process is added, the characteristics of the finally obtained reinforced layer $L_3$ are unchanged. The rising process is added for the purpose of removing the remaining ingredient of the molten salt bath on the glass surface obtained after Step A before it entering the thermal processing process (e.g. baking) of Step B, so as to avoid the destruction on the purity of the finally obtained single reinforced layer $L_3$ by the remaining ingredient of the molten salt bath that is reacted upon heating and attached to the glass surface during the thermal processing of Step B, and avoid the contamination of the molten salt bath used in Step C arising therefrom.

Figure 2:
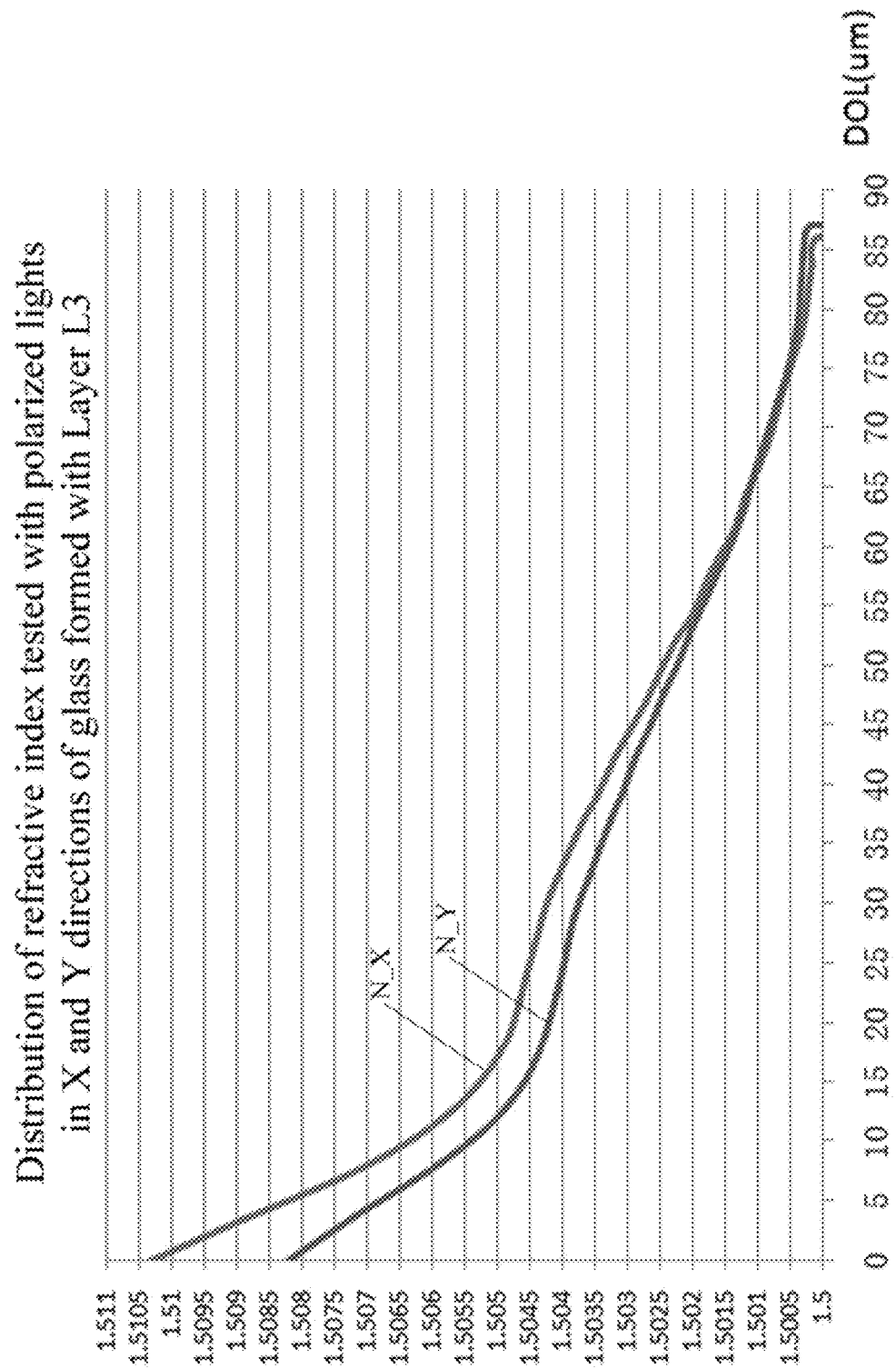
FIG. 2 shows distribution curves of the refractive index tested with polarized lights in X and Y directions of glass with a single reinforced layer obtained in an embodiment of the present invention.

As shown in FIG. 2, the refractive index of the reinforced glass having the single reinforced layer $L_3$ prepared through the method above has the following characteristics.

When the stress is measured by an optical method, the refractive index tested with two polarized lights are obtained, and then the surface stress is calculated according to the difference therebetween and according to various constants and variables of the glass and the measuring instrument. The test method is within the prior art of the industry, and will not be described again in the present invention. FIG. 2 shows distribution curves of the refractive index tested with polarized lights in X and Y directions of glass with a single reinforced layer obtained in this example. Two refractive index distribution curves are correspondingly obtained. Apparently, FIG. 2 obviously shows that the refractive index of the single reinforced layer $L_3$ trends to decreases non-linearly, on the whole, from the surface of the glass body to the interior of the glass body, and the refractive index curve of the single reinforced layer $L_3$ has at least two inflection points.

Figure 3:
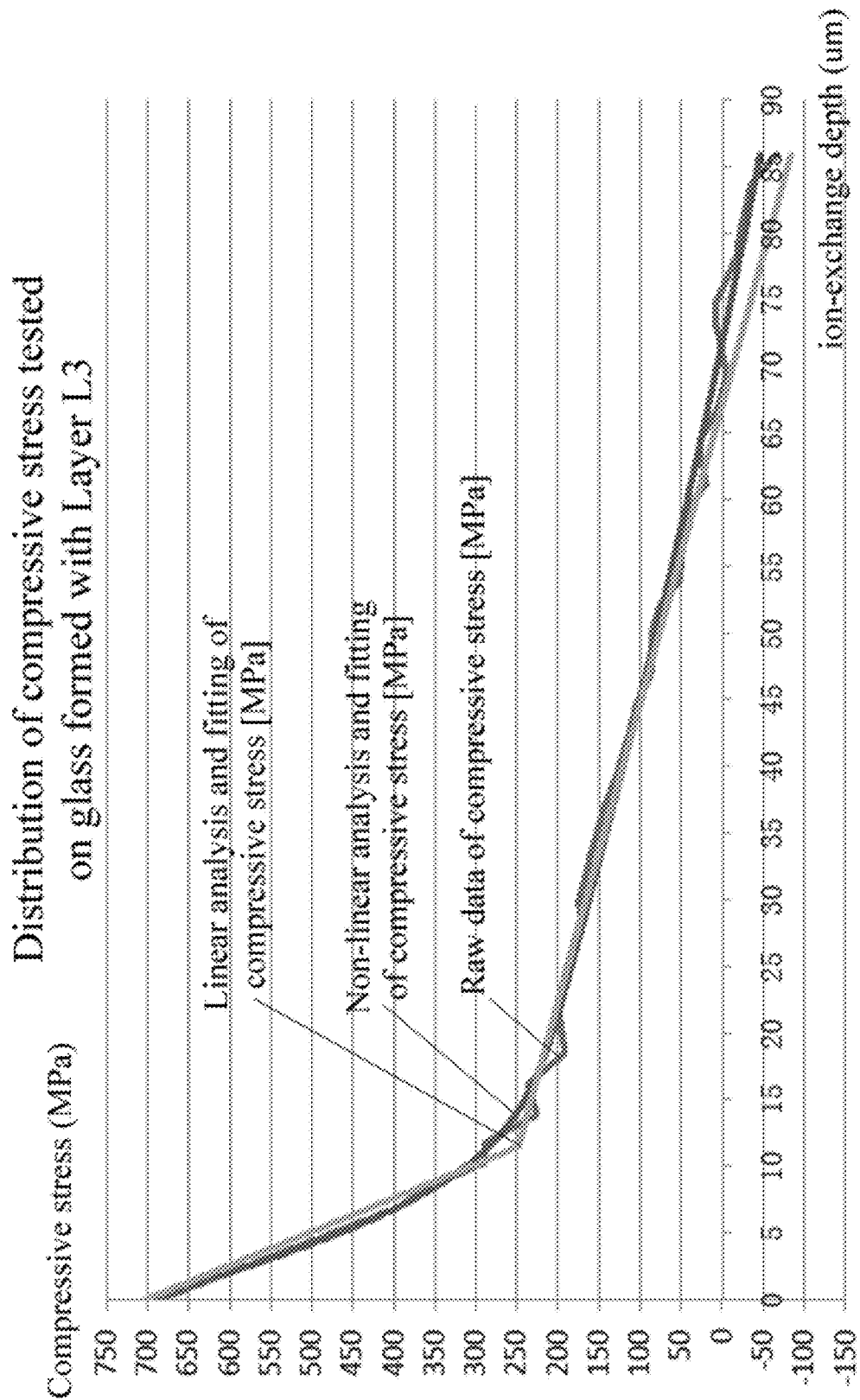
FIG. 3 shows a compressive stress distribution curve of glass with a single reinforced layer obtained in an embodiment of the present invention.

As shown in FIG. 3, the compressive stress of the single reinforced layer $L_3$ has the following characteristics.

It is known in the art that the compressive stress is obtained through calculation based on the values of the refractive indices measured at selected points and on other constants and variables introduced, and then fitting a final curve. The method of fitting a curve is within the prior art of the industry, and will not be described again in the present invention. Apparently, FIG. 3 obviously shows that the compressive stress of the single reinforced layer $L_3$ trends to decrease non-linearly from the surface of the glass body to the interior of the glass body; and the compressive stress curve of the single reinforced layer $L_3$ has an inflection point, and the gradient of a first curve section in front of the inflection point is greater than a second curve section behind the inflection point.

Compared with the prior art, the present invention has the following advantages.

In the preparation method according to the present invention, a condition is established between the time and temperature for the thermal processing in Step B and the time and temperature for the second ion exchange process in Step C: $T_2 \times t_2 < T_h \times (t_h/2)$. Glass with a single reinforced layer having characteristics different from those of the reinforced glass in the prior art is obtained through the preparation process where the condition is satisfied. Firstly, the refractive index of the glass has unique features. That is, the refractive index of the single reinforced layer trends to decrease non-linearly, on the whole, from the surface of the glass body to the interior of the glass body, and the refractive index curve of the single reinforced layer has at least two inflection points. Secondly, the compressive stress distribution of the glass has its own features. That is, the compressive stress of the single reinforced layer trends to decrease non-linearly from the surface of the glass body to the interior of the glass body; and the compressive stress curve of the single reinforced layer has an inflection point, the gradient of a first curve section in front of the inflection point is greater than a second curve section behind the inflection point.

The foregoing description is merely illustrative of the preferred embodiments of the present invention and is not intended to limit the present invention. Any modifications, equivalent replacements and improvements made without departing from the spirit and principles of the invention are encompassed in the protection scope of the present invention.

The invention claimed is:

1. Glass with a reinforced layer, comprising:
   a glass body; and
   the reinforced layer formed in a surface of the glass body, wherein the compressive stress of the reinforced layer trends to decrease non-linearly from the surface of the glass body to the interior of the glass body, the compressive stress curve of the reinforced layer has one inflection point, and the gradient of a first curve section in front of the inflection point is greater than the gradient of a second curve section behind the inflection point, and an overall refractive index of the reinforced layer trends to decrease non-linearly from the surface of the glass body to the interior of the glass body, and the refractive index curve of the reinforced layer has at least two inflection points;
   wherein a maximum value of the refractive index presents at an outermost surface of the glass body, and a difference between the maximum value and the refractive index of the glass body is not higher than 0.1.

2. The glass with a reinforced layer according to claim 1, wherein the single reinforced layer contains metal ions exchanged into the single reinforced layer, and the molar concentration of the metal ions exchanged into the single reinforced layer trends to decrease non-linearly in a direction running from the surface of the glass body to the interior of the glass body.

3. The glass with a reinforced layer according to claim 1, wherein a first inflection point on the refractive index curve of the single reinforced layer is located at a position between 5-30 μm in the direction from the surface of the glass body to the interior of the glass body, and located at a position reaching 4-50% of a total ion-exchange depth in the direction from the surface of the glass body to the interior of the glass body, a second inflection point is located at a position between 10-50 μm in the direction from the surface of the glass body to the interior of the glass body, and located at a position reaching 8-85% of the total ion-exchange depth in the direction from the surface of the glass body to the interior of the glass body.

4. The glass with a reinforced layer according to claim 1, wherein the total ion-exchange depth is not less than 60 μm, and the compressive stress at the surface of the glass body is not less than 600 Mpa.

5. The glass with a single reinforced layer according to claim 1, wherein the reinforced glass has a thickness of 0.1-10 mm.

6. The glass with a reinforced layer according to claim 1, wherein the glass is alkaline silicate glass comprising:
   15-72 wt % of $SiO_2$;
   10-43 wt % of $Al_2O_3$ or/and $P_2O_5$ in total;
   8-33 wt % of alkaline metal oxides in total; and
   less than 15 wt % of other oxides.

* * * * *